United States Patent
Ishida et al.

(10) Patent No.: US 8,903,279 B2
(45) Date of Patent: Dec. 2, 2014

(54) DRIVE UNIT AND IMAGE FORMING APPARATUS INCLUDING SAME

(71) Applicants: Masahiro Ishida, Kanagawa (JP); Shinya Shimizu, Kanagawa (JP)

(72) Inventors: Masahiro Ishida, Kanagawa (JP); Shinya Shimizu, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 107 days.

(21) Appl. No.: 13/766,140

(22) Filed: Feb. 13, 2013

(65) Prior Publication Data
US 2013/0251404 A1 Sep. 26, 2013

(30) Foreign Application Priority Data

Mar. 21, 2012 (JP) .................................. 2012-063565

(51) Int. Cl.
*G03G 15/00* (2006.01)
*G03G 15/16* (2006.01)
*F16H 7/10* (2006.01)
*F16H 7/02* (2006.01)

(52) U.S. Cl.
CPC ............... *F16H 7/10* (2013.01); *G03G 15/1615* (2013.01); *G03G 15/757* (2013.01); *F16H 7/02* (2013.01)
USPC ........................................................ 399/167

(58) Field of Classification Search
CPC .... G03G 15/757; G03G 15/1615; F16H 7/00; F16H 7/02

USPC ............................................ 399/167; 474/138
See application file for complete search history.

(56) References Cited

U.S. PATENT DOCUMENTS

2008/0145101 A1* 6/2008 Seto ............................. 399/167
2012/0201571 A1 8/2012 Yamazaki et al.

FOREIGN PATENT DOCUMENTS

| JP | 2000-267379 | 9/2000 |
| JP | 2001-254790 | 9/2001 |
| JP | 2004-100863 | 4/2004 |
| JP | 2012-180927 | 9/2012 |

* cited by examiner

*Primary Examiner* — G. M. Hyder
*Assistant Examiner* — Travis Harper
(74) *Attorney, Agent, or Firm* — Harness, Dickey & Pierce, P.L.C.

(57) ABSTRACT

A drive unit includes a drive pulley connected to a drive source, a driven pulley connected to a target to be moved, at least one relay pulley for transmitting power from the drive pulley to the driven pulley, a plurality of belts including a first belt entrained around the drive pulley and the relay pulley, and a second belt entrained around the relay pulley and the driven pulley, a first tension application device, and a second tension application device. The first tension application device contacts the first belt to provide tension thereto. The second tension application device contacts the second belt to provide tension thereto. A cyclic speed variation component of the first belt in one rotation period transmitted to the driven pulley via the relay pulley and a speed variation component of the second belt in one rotation period transmitted to the driven pulley counteract each other.

10 Claims, 4 Drawing Sheets

DRIVE UNIT AND IMAGE FORMING APPARATUS INCLUDING SAME

CROSS-REFERENCE TO RELATED APPLICATIONS

This patent application is based on and claims priority pursuant to 35 U.S.C. §119 to Japanese Patent Application No. 2012-063565, filed on Mar. 21, 2012, in the Japan Patent Office, the entire disclosure of which is hereby incorporated by reference herein.

BACKGROUND OF THE INVENTION

1. Field of the Invention

Exemplary aspects of the present invention generally relate to a drive unit and an image forming apparatus including the drive unit, and more particularly to an image forming apparatus such as a copier, a facsimile machine, a printer, or a multi-functional system including a combination thereof.

2. Description of the Related Art

Related-art image forming apparatuses, such as copiers, facsimile machines, printers, or multifunction printers having at least one of copying, printing, scanning, and facsimile capabilities, typically form an image on a recording medium according to image data. Thus, for example, a charger uniformly charges a surface of an image bearing member (which may, for example, be a photosensitive drum); an optical writer projects a light beam onto the charged surface of the image bearing member to form an electrostatic latent image on the image bearing member according to the image data; a developing device supplies toner to the electrostatic latent image formed on the image bearing member to render the electrostatic latent image visible as a toner image; the toner image is directly transferred from the image bearing member onto a recording medium or is indirectly transferred from the image bearing member onto a recording medium via an intermediate transfer member; a cleaning device then cleans the surface of the image carrier after the toner image is transferred from the image carrier onto the recording medium; finally, a fixing device applies heat and pressure to the recording medium bearing the unfixed toner image to fix the unfixed toner image on the recording medium, thus forming the image on the recording medium.

Such known image forming apparatuses employ a drive unit to drive various components. An example of a known drive unit includes a drive timing belt entrained around a drive pulley provided to a drive shaft of a drive motor and a relay pulley, and a driven timing belt entrained around the relay pulley and a driven pulley, thereby transmitting the driving force of the drive shaft of the drive motor to the rotary shaft of targets to be moved. Such targets include, but are not limited to, the image bearing member (i.e., a photosensitive drum), the intermediate transfer member, and a recording medium conveyor.

In the known drive unit, the drive timing belt and the driven timing belt are arranged in a rotary shaft direction of the relay pulley. In order to reduce a cyclic speed variation of the drive timing belt and the driven timing belt in one rotation period thereof, the drive timing belt and the driven timing belt are arranged such that eccentric components of these belts counteract each other on the driven pulley. More specifically, as the eccentric component of the drive timing belt is transmitted to the driven timing belt via the relay pulley, waves of the eccentric component of the drive timing belt cancel waves of the eccentric component of the driven timing belt. Accordingly, the cyclic speed variation in one rotation period of each timing belt is not transmitted to the driven pulley, thereby preventing fluctuation in the speed of targets.

The drive unit employed in the image forming apparatus needs to rotate the targets at a certain speed. Thus, a rotation force of the drive motor serving as a drive source of the drive unit is adjusted in accordance with a rotation load so as to rotate the targets at a desired constant speed. However, if there is a sudden change in the load, unless the tension of the drive timing belt and the driven timing belt is optimized, the drive timing belt and the driven timing belt cannot rotate in accordance with the force transmitted from the drive motor, causing fluctuation in the speed of devices.

In view of the above, there is unsolved need for a drive unit capable of preventing fluctuation of speed of devices and a cyclic speed variation in one rotation of timing belts, and an image forming apparatus including such a drive unit.

SUMMARY OF THE INVENTION

In view of the foregoing, in an aspect of this disclosure, there is provided an improved drive unit including a drive pulley, a driven pulley, at least one relay pulley, a plurality of belts, a first tension application device, and a second tension application device. The drive pulley is connected to a drive source. The driven pulley is connected to a target to be moved. At least one relay pulley transmits power from the drive pulley to the driven pulley. The plurality of belts is entrained around and stretched taut between the drive pulley, the driven pulley, and the relay pulley. The plurality of belts includes a first belt entrained around the drive pulley and the relay pulley, and a second belt entrained around the relay pulley and the driven pulley. The first tension application device contacts the first belt to provide tension thereto. The second tension application device contacts the second belt to provide tension thereto. The first belt and the second belt have a positional relation in a direction of rotation thereof in that a cyclic speed variation component in one rotation period of the first belt transmitted to the driven pulley via the relay pulley and a speed variation component in one rotation period of the second belt transmitted to the driven pulley counteract each other.

According to another aspect, an image forming apparatus includes a housing, an image forming unit to form an image, and the drive unit to drive a target provided to the housing. The image forming unit and the drive unit are disposed in the housing.

The aforementioned and other aspects, features and advantages would be more fully apparent from the following detailed description of illustrative embodiments, the accompanying drawings and the associated claims.

BRIEF DESCRIPTION OF THE SEVERAL VIEWS OF THE DRAWINGS

A more complete appreciation of the disclosure and many of the attendant advantages thereof will be more readily obtained as the same becomes better understood by reference to the following detailed description of illustrative embodiments when considered in connection with the accompanying drawings, wherein.

DETAILED DESCRIPTION OF THE INVENTION

Figure 1:
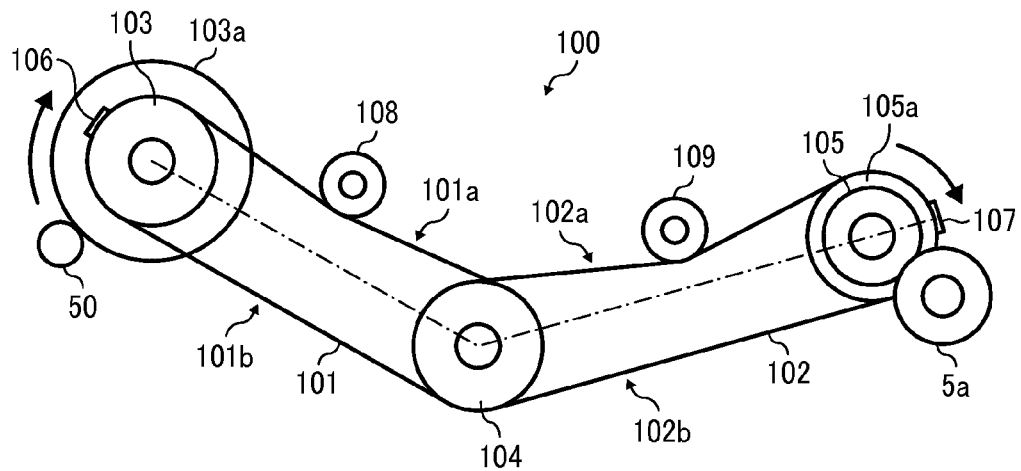
FIG. 1 is a schematic diagram illustrating a drive unit including a relay pulley according to an illustrative embodiment of the present invention.

A description is now given of illustrative embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of this disclosure.

In addition, it should be noted that the terminology used herein is for the purpose of describing particular embodiments only and is not intended to be limiting of this disclosure. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing illustrative embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

In a later-described comparative example, illustrative embodiment, and alternative example, for the sake of simplicity, the same reference numerals will be given to constituent elements such as parts and materials having the same functions, and redundant descriptions thereof omitted.

Typically, but not necessarily, paper is the medium from which is made a sheet on which an image is to be formed. It should be noted, however, that other printable media are available in sheet form, and accordingly their use here is included. Thus, solely for simplicity, although this Detailed Description section refers to paper, sheets thereof, paper feeder, etc., it should be understood that the sheets, etc., are not limited only to paper, but include other printable media as well.

Figure 2:
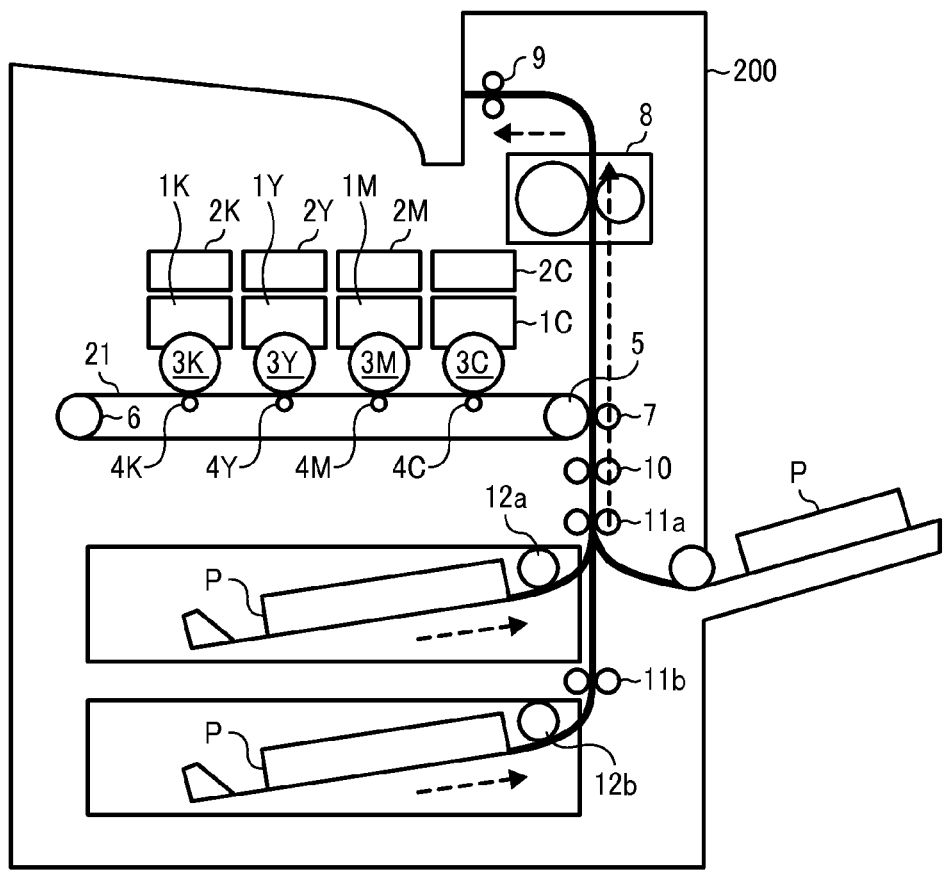
FIG. 2 is a schematic diagram illustrating an image forming apparatus according to an illustrative embodiment of the present invention.

Referring now to the drawings, wherein like reference numerals designate identical or corresponding parts throughout the several views, and initially with reference to FIG. 2, a description is provided of an image forming apparatus according to an aspect of this disclosure.

FIG. 2 is a schematic diagram illustrating an image forming apparatus employing a drive unit according to an illustrative embodiment of the present invention. The image forming apparatus illustrated in FIG. 2 is a tandem-type image forming apparatus in which a plurality of image forming units, one for each of the colors black (B), yellow (Y), magenta (M), and cyan (C), are arranged tandem in a housing 200 serving as a main body of the image forming apparatus. The image forming units form a respective color image. It is to be noted that suffixes B, Y, M, and C denote colors black, yellow, magenta, and cyan, respectively. These suffixes indicating the colors are omitted, unless otherwise specified. The plurality of image forming units includes toner image forming devices 1K, 1Y, 1M, and 1C, optical writing units 2K, 2Y, 2M, and 2C, photosensitive drums 3K, 3Y, 3M, and 3C, transfer rollers 4K, 4Y, 4M, and 4C, and so forth.

The photosensitive drums 3K, 3Y, 3M, and 3C are arranged facing an intermediate transfer belt 21 formed into an endless loop. The photosensitive drums 3K, 3Y, 3M, and 3C rotate at the same peripheral speed as that of the intermediate transfer belt 21. Each of the optical writing units 2K, 2Y, 2M, and 2C includes a semiconductor laser driver circuit that drives a semiconductor laser based on an image signal of the respective color to project a laser beam against the photosensitive drums 3K, 3Y, 3M, and 3C via an fθ lens and so forth.

After the photosensitive drums 3K, 3Y, 3M, and 3K are charged uniformly by the toner image forming devices 1K, 1Y, 1M, and 1C, the photosensitive drums 3K, 3Y, 3M, and 3K are exposed by the optical writing units 2K, 2Y, 2M, and 2C, thereby forming an electrostatic latent image on a surface of the photosensitive drums 3K, 3Y, 3M, and 3C.

The electrostatic latent images formed on the photosensitive drums 3K, 3Y, 3M, and 3C are developed with a respective color of toner by the toner image forming devices 1K, 1Y, 1M, and 1C, thereby forming a visible image of electrostatically held toner particles, known as a toner image. The toner images of black, yellow, magenta, and cyan are formed. The intermediate transfer belt 21 is formed into a loop and entrained around a drive roller 5 and a tension roller 6. The drive roller 5 is driven to rotate by a drive unit which will be described later. The intermediate transfer belt 21 rotates at the same peripheral speed as that of the photosensitive drums 3K, 3Y, 3M, and 3C. Then, the toner images of each color are primarily transferred onto the intermediate transfer belt 21 such that they are superimposed one atop the other, thereby forming a composite toner image. This process is known as a primary transfer process.

In the meantime, a recording medium P serving as a transfer medium stored in a sheet tray is fed to a sheet transport path by sheet feed rollers 12a and 12b and sheet transport rollers 11a and 11b. The recording medium P is delivered to a pair of registration rollers 10. The pair of registration rollers 10 stops temporarily the recording medium P and sends it again to a secondary transfer nip between the intermediate transfer belt 21 and a secondary roller 7 in appropriate timing such that the recording medium P is aligned with the composite toner image formed on the intermediate transfer belt 21.

At the secondary transfer nip, the toner image formed on the intermediate transfer belt 21 is transferred onto the recording medium P in a process known as a secondary transfer process, thereby forming a full-color image on the recording medium P. The recording medium P bearing the unfixed composite color toner image is sent to a fixing device 8 disposed downstream from the secondary transfer nip. In the fixing device 8, heat and pressure are applied to the unfixed composite color toner image on the recording medium P, thereby fixing the unfixed toner image thereon. After the fixing process, the recording medium P is output onto a sheet output tray by a pair of sheet output rollers 9.

In such an image forming apparatus, rotation accuracy of the intermediate transfer belt 21 and the photosensitive drums 3K, 3Y, 3M, and 3C serving as image bearing members influences the quality of an output image significantly. In view of the above, according to the illustrative embodiment, the photosensitive drums 3K, 3Y, 3M, and 3C, and the intermediate transfer belt 21 serving as the image bearing members are rotated by a drive unit 100 (shown in FIG. 1) described below. In the present illustrative embodiment, the drive unit described below can rotate photosensitive drums 3K, 3Y, 3M, and 3C and the intermediate transfer belt 21 with precision, thereby obtaining a high-quality image.

With reference to FIG. 1, a description is provided of the drive unit 100 using a relay pulley 104 according to an illustrative embodiment of the present invention. FIG. 1 is a schematic diagram illustrating the drive unit 100 with the relay pulley 104. The drive unit 100 includes an intermediate-transfer drive roller shaft gear 5a, a drive-motor shaft gear 50 for the drive motor serving as a drive source, a drive timing belt 101 including teeth formed on an inner circumference thereof at a predetermined pitch, and a driven timing belt 102 including teeth formed on an inner circumference thereof at a predetermined pitch.

Furthermore, the drive unit includes a drive pulley 103 including teeth formed at the same pitch as the teeth of the drive timing belt 101, and a drive pulley gear 103a coaxially provided to the same shaft as the drive pulley 103, thereby constituting a single integrated unit with the drive pulley 103. The teeth of the drive pulley 103 mesh with the teeth of the drive timing belt 101. The teeth of the drive pulley gear 103a mesh with the drive-motor shaft gear 50.

Furthermore, the drive unit includes a relay pulley 104, a driven pulley 105, and a driven pulley gear 105a. The relay pulley 104 includes teeth on an outer circumference thereof at the same pitch as the teeth of the drive timing belt 101 and the driven timing belt 102. The teeth of the relay pulley 104 mesh with the teeth of the drive timing belt 101 and the driven timing belt 102. The driven pulley 105 includes teeth formed at the same pitch as the teeth of the driven timing belt 102, and meshes with the teeth of the driven timing belt 102. The driven pulley gear 105a is coaxially provided to the same shaft as the driven pulley 105 and constituted as a single integrated unit with the driven pulley 105. The driven pulley gear 105a meshes with the intermediate-transfer drive roller shaft gear 5a.

In FIG. 1, a mark 106 represents a direction and a position of the drive timing belt 101. A mark 107 represents a direction and a position of the driven timing belt 102. A tensioner 108 provides tension on the drive timing belt 101. A tensioner 109 provides tension on the driven timing belt 102.

The drive pulley 103 is driven by driving the drive pulley gear 103a meshing with the drive-motor shaft gear 50. As the drive pulley 103 is rotated, power is transmitted to the relay pulley 104 via the drive timing belt 101, thereby rotating the relay pulley 104. As the drive pulley 104 is rotated, power is transmitted to the driven pulley 105 via the driven timing belt 102, moving the driven pulley gear 105a coaxially provided on the same shaft as the driven pulley 105. The driven pulley gear 105a meshes with the intermediate-transfer drive roller shaft gear 5a, thereby rotating the drive roller 5.

Figure 3:
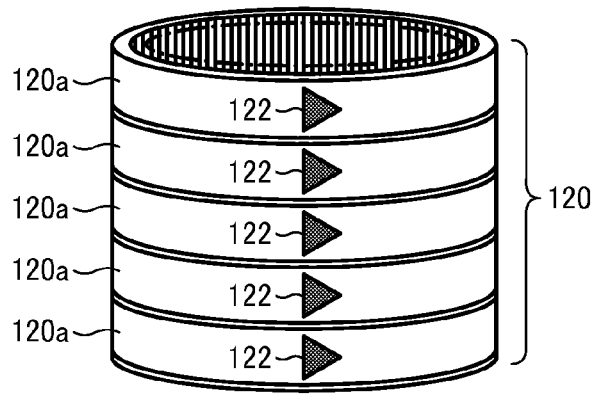
FIG. 3 is a schematic diagram illustrating positional relations of marks provided to a timing belt according to an illustrative embodiment of the present invention.

With reference to FIG. 3, a description is provided of positional relations of marks of the timing belts. FIG. 3 is a schematic diagram illustrating the positional relations of marks on the timing belts according to an illustrative embodiment of the present invention. A belt member 120 shown in FIG. 3 is an endless belt having a width wider than the drive timing belt 101 and the driven timing belt 102. A mark 122 is provided at one place on the circumference of the belt member 120. The belt member 120 is divided into a plurality of belts 120a having the same width (in this example, the belt member is divided into five belts).

The obtained belt strips 120a each having the same and relatively narrow width are hereinafter referred to as timing belts 120a. The timing belts 120a are used as the drive timing belt 101 and the driven timing belt 102. Each of the timing belts 120a includes the mark 122 which indicates a direction and a position, and corresponds to the mark 106 on the drive timing belt 101 and the mark 107 on the driven timing belt 102 illustrated in FIG. 1. Before being divided, the marks 122 are formed on the same straight line on the belt member 120 and face in the same direction.

Upon assembly of elements of the drive unit, the marks 106 and 107 are used as a reference based on which the drive timing belt 101 and the driven timing belt 102 are distributed. With this configuration, the drive timing belt 101 and the driven timing belt 102 are positioned such that the eccentric components of the drive timing belt 101 and the driven timing belt 102 cancel one another on the driven pulley 105.

Figure 4:
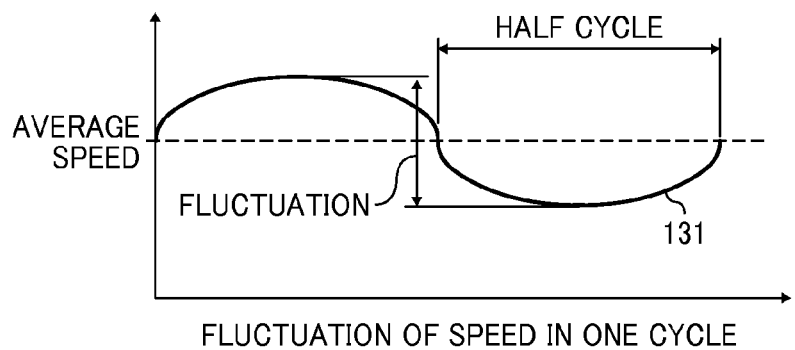
FIG. 4 is a diagram illustrating a cyclic speed variation of a single timing belt in one rotation period.

With reference to FIG. 4, a description is provided of a cyclic speed variation of a single timing belt in one rotation. FIG. 4 illustrates a cyclic speed variation of a single timing belt in one rotation period. As illustrated in FIG. 4, as a speed variation 131, a single timing belt always has a cyclic speed variation in one rotation period due to irregularity of the thickness of the timing belt itself.

Figure 5:
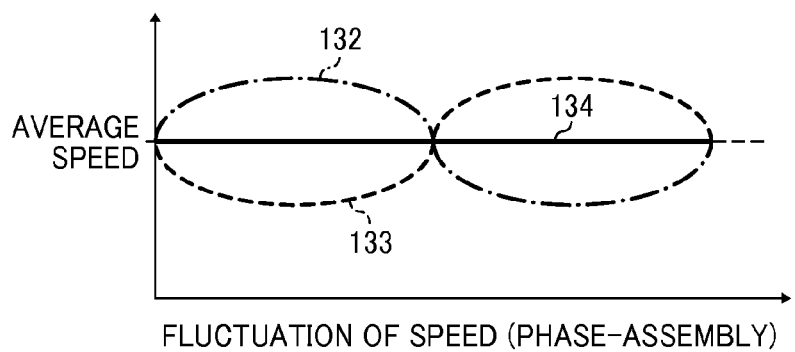
FIG. 5 is a diagram illustrating a speed variation when two timing belts are assembled in phase.

FIG. 5 illustrates a speed variation of two timing belts when two timing belts are assembled in phase. In FIG. 5, reference numeral 132 represents a speed variation of the drive timing belt 101, and reference numeral 133 represents a speed variation of the driven timing belt 102. Reference numeral 134 represents a speed variation occurring on the driven pulley 105 when the drive timing belt 101 and the driven timing belt 102 are assembled in phase.

As described above, the timing belt has a cyclic speed variation in one rotation. The drive timing belt 101 and the driven timing belt 102 have the same length, and the speed variation of the drive timing belt 101 and the speed variation of the driven timing belt 102 have the same amplitude. Thus, upon assembly, the drive timing belt 101 and the driven timing belt 102 are shifted by 180 degrees. With this configuration, as illustrated in FIG. 5, the cyclic speed variation of the timing belts in one rotation period is cancelled on the driven pulley 105 as indicated by reference numeral 134.

As for the drive timing belt 101, the rotational force of the drive pulley 103 causes the drive timing belt 101 to rotate. Thus, a surface 101b of the drive timing belt 101, being pulled by the drive pulley 103 and moving from the relay pulley 104 to the drive pulley 103, is relatively stretched. By contrast, a surface 101a of the drive timing belt 101, sent from the drive pulley 103 to the relay pulley 104, retains slack.

As for the driven timing belt 102, the rotational force of the relay pulley 104 causes the driven timing belt to rotate. Thus, a surface 102b of the driven timing belt 102, being pulled by the relay pulley 104 and moving from the driven pulley 105 to the relay pulley 104, is relatively stretched. By contrast, a surface 102a of the driven timing belt 102, sent from the relay pulley 104 to the driven pulley 105, retains slack.

If there is a sudden change in the load, unless the tension of the drive timing belt 101 and the driven timing belt 102 is optimized, the drive timing belt 101 and the driven timing belt 102 cannot rotate in accordance with the force transmitted from the drive motor, causing speed fluctuations.

A sudden change in the speed occurs when a recording medium P passes through the secondary transfer nip between the secondary transfer roller 7 and the drive roller 5 via the intermediate transfer belt 21, for example. More specifically, as the leading edge of the recording medium P enters the secondary transfer nip between the secondary transfer roller 7 and the drive roller 5 via the intermediate transfer belt 21, the recording medium P pushes the secondary transfer roller 7 and the drive roller 5 via the intermediate transfer belt 21, widening the secondary transfer nip by an amount of the thickness of the recording medium P. As a result, a load is suddenly applied to the drive roller 5 and the driven pulley 105, causing rotation of the driven pulley 105 to slow down temporarily.

Such a sudden speed fluctuation changes the tension of the drive timing belt 101 and the driven timing belt 102. The tension of the drive timing belt 101 and the driven timing belt 102 may no longer be optimized. More specifically, the sudden load on the driven pulley 105 slows down the rotation of the driven pulley 105 temporarily. Consequently, an amount of the belt sent from the relay pulley 104 to the driven pulley 105 becomes more than an amount of the belt moving from the driven pulley 105 to the relay pulley 104, and the portion of the driven timing belt 102 between the relay pulley 104 and the driven pulley 105 retains slack, reducing the tension of the belt.

Furthermore, as the rotation speed of the relay pulley 104 is reduced temporarily, the amount of the belt sent from the driven pulley 105 to the relay pulley 104 is reduced so that the driven timing belt 102 decelerates the relay pulley 104. That is, rotation of the relay pulley 104 slows down temporarily. As a result, the amount of the belt sent from the drive pulley 103 to the relay pulley 104 becomes greater than the amount of the belt sent from the relay pulley 104 to the drive pulley 103, thereby reducing the tension of the portion of the drive timing belt 101 between the drive pulley 103 and the relay pulley 104. The drive timing belt 101 between the drive pulley 103 and the relay pulley 104 retains slack.

As described above, such a sudden load on the driven pulley 105 changes the belt tension between the drive timing belt 101 and the driven timing belt 102. The change in the tension causes fluctuation of the speed of the drive timing belt 101 and the driven timing belt 102. Consequently, the fluctuation of the speed of the drive timing belt 101 and the driven timing belt 102 is transmitted to the driven pulley 105, causing the speed of the driven pulley 105 to fluctuate. The change in the speed of the driven pulley 105 results in fluctuation of the speed of the intermediate transfer belt 21 via the drive roller 5. As a result, toner images transferred from the photosensitive drums 3K, 3Y, 3M, and 3C onto the intermediate transfer belt 21 are misformed, i.e., shrunk or stretched, causing irregular image density in the resulting output image. Because the toner images in different colors are transferred from the photosensitive drums 3K, 3Y, 3M, and 3C onto the intermediate transfer belt 21 such that they are superimposed one atop the other, the change in the speed of the intermediate transfer belt 21 causes color drift in the composite toner image.

In view of the above, according to the present illustrative embodiment, the tensioner 108 is provided at the drive timing belt 101 side sent from the drive pulley 103 and the relay pulley 104. More specifically, the tensioner 108 contacts the surface 101a of the drive timing belt 101 which retains slack. The tensioner 109 is provided at the driven timing belt 102 side sent from the relay pulley 104 and the driven pulley 105. More specifically, the tensioner 109 contacts the surface 102a of the driven timing belt 102 which retains slack. The tensioner 108 provides tension to the drive timing belt 101. The tensioner 109 provides tension to the driven timing belt 102. With this configuration, the drive timing belt 101 and the driven timing belt 102 are prevented from slackening, thereby optimizing the tension of the drive timing belt 101 and the driven timing belt 102 to prevent fluctuation of the speed due to sudden changes in the load.

The tensioner 108 contacts the surface 101a of the drive timing belt 101 at the slackening side, and the tensioner 109 contacts the surface 102a of the driven timing belt 102 at the slackening side. With this configuration, the influence of irregularity of the thickness of the timing belts in the circumferential direction is suppressed, thereby preventing fluctuation of the speed.

Figure 6:
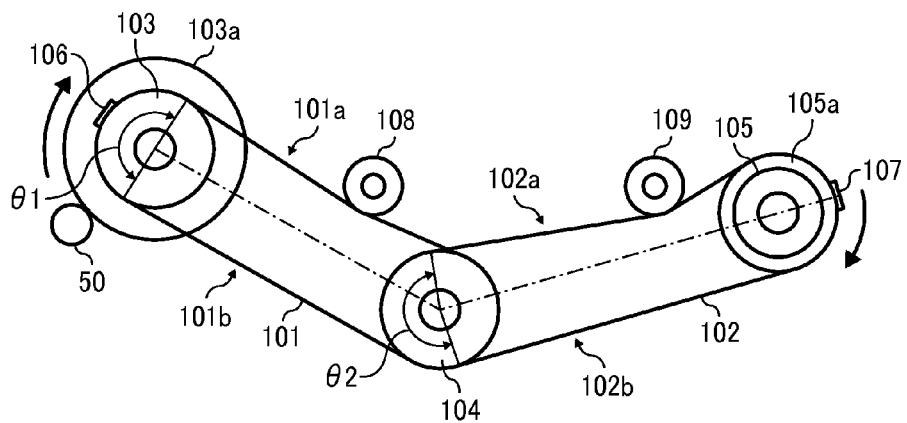
FIG. 6 is a schematic diagram illustrating pulleys and the timing belts according to an illustrative embodiment of the present invention.

With reference to FIG. 6, a description is provided of a winding angle of the timing belts around the pulleys. In FIG. 6, an angle $\theta_1$ is a winding angle of the drive timing belt 101 around the drive pulley 103 and is determined based on the position of the tensioner 108 relative to the drive timing belt 101. An angle $\theta_2$ is a winding angle of the driven timing belt 102 around the relay pulley 104 and is determined based on the position of the tensioner 109 relative to the driven timing belt 102.

According to the present illustrative embodiment, the tensioners 108 and 109 are disposed such that the angle $\theta_1$ and the angle $\theta_2$ have the same angle. With this configuration, the rotation paths of the drive timing belt 101 and the driven timing belt 102 are the same, thereby preventing the cyclic speed variation of the timing belts in one rotation period caused by different rotation paths.

Figure 7:
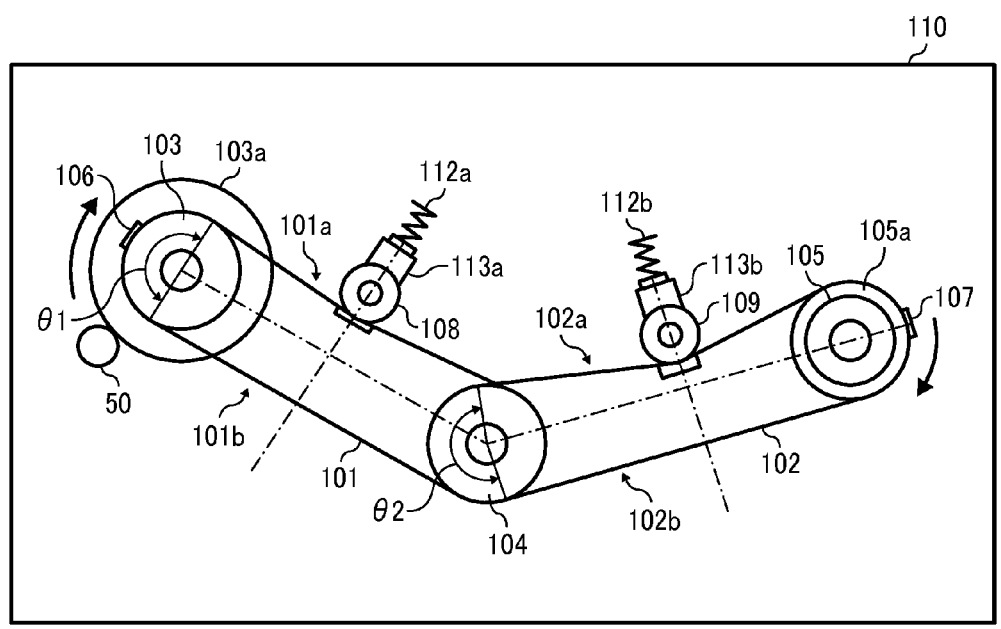
FIG. 7 is a schematic diagram illustrating tension springs that press tensioners against the timing belts according to an illustrative embodiment of the present invention.

With reference to FIG. 7, a description is provided of installation of the tensioners 108 and 109. As illustrated in FIG. 7, the tensioner 108 is movably supported by a support member 113a to which a spring 112a is attached. The tensioner 109 is movably supported by a support member 113b to which a spring 112b is attached. The support members 113a and 113b are movable relative to a main body 110 of the drive unit 100. The springs 112a and 112b press the tensioners 108 and 109 against the drive timing belt 101 and the driven timing belt 102, respectively, via the support members 113a and 113b, thereby providing the same tension to the drive timing belt 101 and the driven timing belt 102. With this configuration, the cyclic speed variation of the timing belts in one rotation caused by the relative difference in tension is prevented.

Figure 8:
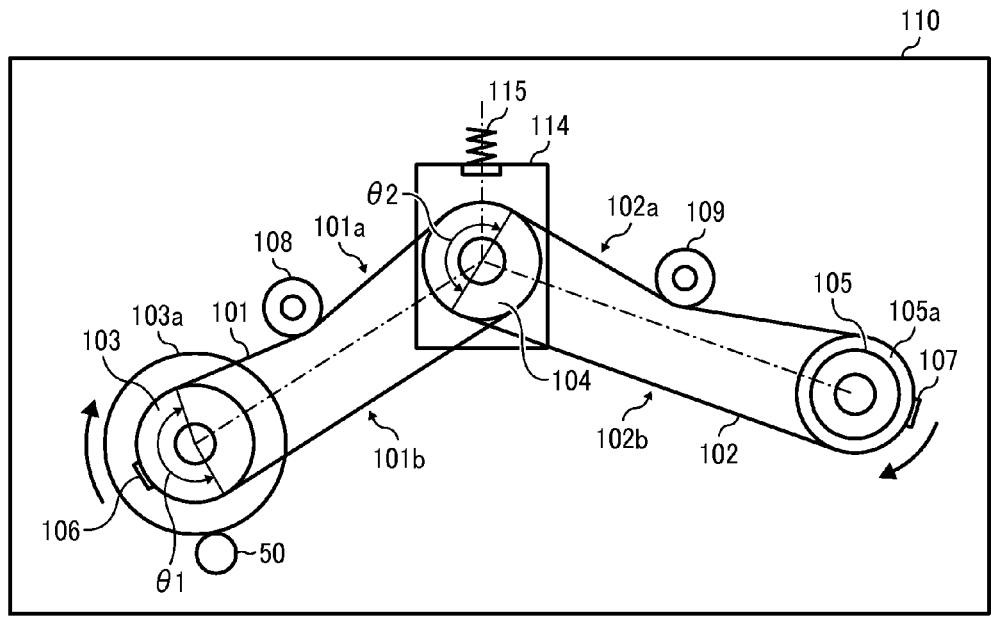
FIG. 8 is a schematic diagram illustrating the drive unit including the relay pulley rotatably supported by a pulley support member.

With reference to FIG. 8, a description is provided of a support mechanism for the relay pulley 104. In the present illustrative embodiment, the relay pulley 104 is rotatably supported by a pulley support member 114 which is movably disposed relative to a main body 110 of the drive unit 100. As the tensile force of a spring 115 pulls up the pulley support member 114, moving the relay pulley 104 up, the drive timing belt 101 is pressed against the tensioner 108 and the driven timing belt 102 is pressed against the tensioner 109, thereby providing the same tension to the drive timing belt 101 and the driven timing belt 102. With this configuration, the cyclic speed variation of the timing belts in one rotation caused by the relative difference in tension is prevented.

Figure 9:
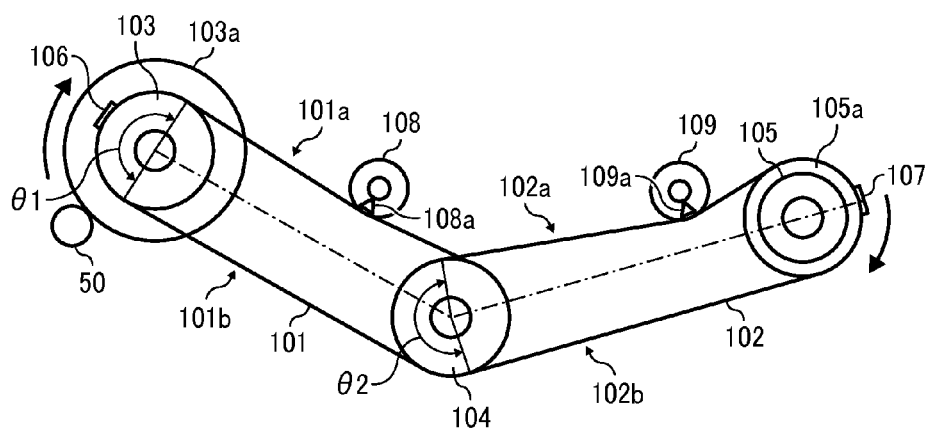
FIG. 9 is a schematic diagram illustrating the drive unit when assembled based on the maximum displacement position in one rotation of the tensioners.

With reference to FIG. 9, a description is provided of assembly of the drive unit 100 using a mark provided at a maximum displacement position of the eccentric component of each of the tensioners 108 and 109 per rotation period.

In FIG. 9, a mark 108a is provided at a maximum displacement position of the eccentric component of the tensioner 108 in one rotation period, and a mark 109a is provided at a maximum displacement position of the eccentric component of the tensioner 109 in one rotation period. As illustrated in FIG. 9, upon assembly of the tensioners 108 and 109, the mark 108a of the tensioner 108 and the mark 109a of the tensioner 109 are aligned. More specifically, the mark 108a is brought to a position at which the drive timing belt 101 and the tensioner 108 contact. The mark 109a is brought to a position at which the driven timing belt 102 and the tensioner 109 contact. With this configuration, the eccentric components in one rotation period of the tensioner 108 and the tensioner 109 are canceled one another.

Furthermore, in the image forming apparatus for producing a color image as illustrated in FIG. 2, the image forming units are arranged in tandem at predetermined intervals (also referred to as station pitch) between each other. In other words, the station pitch is a distance between adjacent image forming units, and the image forming units are disposed equally spaced. The reference position for the station pitch of each image forming unit is provided substantially at the center of the primary transfer nip in the direction of rotation of the intermediate transfer belt, at which the photosensitive drum 3 and the transfer roller 4 meet via the intermediate transfer belt 21. One rotation period of the tensioners 108 and 109 is set to 1/n times the station pitch, where n is a positive integer. With this configuration, even when the eccentric components in one rotation period of the tensioners 108 and 109 cannot be canceled due to assembly errors, image defects such as color drift can be suppressed, if not prevented entirely.

Preferably, one rotation period of the tensioners 108 and 109 is set to 1/n times a distance D, where n is a positive integer and the distance D is a distance between an exposure position of the photosensitive drum in the direction of rotation thereof and the transfer position. With this configuration, even when the eccentric components in one period of the tensioners 108 and 109 cannot be canceled due to assembly errors, image defects such as color drift can be suppressed, if not prevented entirely.

In the present illustrative embodiment, the photosensitive drums and the intermediate transfer belt are rotated by the drive unit 100 in the image forming apparatus. The drive unit 100 of the illustrative embodiment of the present invention can be applied to an image forming apparatus using a transfer drum serving as an image bearing member to rotate the transfer drum. For example, the drive unit 100 may be employed in a color copier in which latent images formed on a closed-loop photosensitive belt are developed with toner and transferred onto the transfer drum which is rotated by the drive unit 100. Then, the composite toner image on the transfer drum is transferred onto a recording medium.

Furthermore, the drive unit of the illustrative embodiment of the present invention may be employed in the image forming apparatus using the direct-transfer method. In this configuration, the toner images formed on the photosensitive drums serving as image bearing members facing a transfer belt are transferred directly onto a recording medium carried on the transfer belt. The transfer belt and the photosensitive drums are driven by the drive unit 100 the present invention.

In the present illustrative embodiment, the drive timing belt 101 and the driven timing belt 102 are arranged relative to the relay pulley 104 in the rotation shaft direction of the relay pulley 104. However, the number of relay pulleys is not limited to one. More than one relay pulley may be provided. For example, when using two relay pulleys, the drive timing belt 101 is entrained around the drive pulley 103 and a first relay pulley. The driven timing belt 102 is entrained around a second relay pulley and the driven pulley 105. Similar to the timing belt 120a illustrated in FIG. 3, the timing belts 120a serving as the drive timing belt 101 and the second timing belt 102 are entrained around the first relay pulley and the second relay pulley. Each timing belt entrained around the pulleys may be disposed such that the cyclic speed variation of each timing belt in one rotation period are canceled one another on the driven pulley 105.

A tensioner may contact the slackening surface of the timing belt entrained around and stretched taut between the first relay pulley and the second relay pulley so as to provide tension thereto. With this configuration, even when there is a sudden change in the load, the speed fluctuation can be prevented. In this case, the tensioner may be provided in a similar manner as the tensioner 108 and the tensioner 109 described above.

Although the embodiment of the present invention has been described above, the present invention is not limited to the foregoing embodiments, but a variety of modifications can naturally be made within the scope of the present invention.

A drive unit includes a drive pulley (i.e., the drive pulley 103) connected to a drive source such as a drive motor; a driven pulley (i.e., the driven pulley 105) connected to a target to be moved (i.e., the intermediate-transfer drive roller shaft gear 5a); at least one relay pulley (i.e., the relay pulley 104) to transmit power from the drive pulley to the driven pulley; a plurality of belts entrained around and stretched taut between the drive pulley, the driven pulley, and the relay pulley, the plurality of belts including a first belt (i.e., the drive timing belt 101) entrained around the drive pulley and the relay pulley, and a second belt entrained around the relay pulley and the driven pulley; a first tension application device (i.e., the tensioner 108) to contact the first belt to provide tension thereto; and a second tension application device (i.e., the tensioner 109) to contact the second belt to provide tension thereto. The first belt and the second belt have a positional relation in a direction of rotation thereof in that a speed variation component in one rotation period of the first belt transmitted to the driven pulley via the relay pulley and a speed variation component in one rotation period of the second belt transmitted to the driven pulley counteract each other.

With this configuration, even when there is a sudden change in the load, a cyclic speed variation of the timing belts in one rotation period thereof is reduced, if not prevented entirely.

According to an aspect of the disclosure, the first tension application device contacts a surface (i.e., the surface 101a) of the first belt which slackens, and the second tension application device contacts a surface of the second belt (i.e., the surface 102a) which slackens. With this configuration, the influence of irregularity of the thickness of the timing belts in the circumferential direction is suppressed, thereby preventing fluctuation of the speed.

According to an aspect of the disclosure, the first tension application device and the second tension application device are disposed such that a winding angle of the first belt wound around the drive pulley coincides with a winding angle of the second belt wound around the relay pulley. Accordingly, the cyclic speed variation of the timing belts in one rotation period thereof caused by different rotation paths of the first belt and the second belt is canceled.

According to an aspect of the disclosure, the first tension application device provides tension to the first belt, and the second tension application device provided tension to the second belt such that the tension of the first belt and that of the second belt are the same. Accordingly, the cyclic speed variation of the timing belts in one rotation period thereof caused by different tension of the first belt and the second belt is reduced, if not prevented entirely.

According to an aspect of the disclosure, the relay pulley is movable relative to a housing (i.e., the housing 110) of the drive unit. By moving the relay pulley, the first roller (i.e., the tensioner 108) contacts the first belt and the second roller (i.e., the tensioner 109) contacts the second belt. Accordingly, the cyclic speed variation of the timing belts in one rotation period thereof caused by different tension of the first belt and the second belt is reduced, if not prevented entirely.

According to an aspect of the disclosure, each of the first roller of the first tension application device and the second roller of the second tension application device includes a mark (i.e., the marks 108a and 109a) by which a phase of one rotation period of the first roller and a phase of one period of rotation of the second roller are aligned. With this configuration, the cyclic speed variation of the timing belts in one rotation period thereof is reduced, if not prevented entirely.

According to an aspect of the disclosure, an image forming apparatus is equipped with an image forming mechanism to form an image, a housing to house the image forming unit, and the above-described drive unit to drive a target provided to the housing. With this configuration, even when there is a sudden change in the load, a cyclic speed variation in one rotation period of the timing belts and the tensioners is reduced, if not prevented entirely, and hence preventing image defects such as color drift.

According to an aspect of the disclosure, the image forming mechanism include a plurality of image forming units (i.e., 1K, 1Y, 1M, and 1C) arranged in a certain direction Each of the plurality of image forming units includes an image bearing member (i.e., the photosensitive drums 3K, 3Y, 3M, and 3C). One rotation period of each of the first and the second rollers (the tensioners 108 and 109) is 1/n times a station pitch, where n is an integer and the pitch station is a distance between adjacent image forming units. With this configuration, image defects such as color drift are prevented.

According to an aspect of the disclosure, the image forming apparatus further includes a latent image forming device (i.e., the optical writing units 2K, 2Y, 2M, and 2C) disposed near the image bearing member, to expose the surface of the image bearing member at an exposure position to form a latent image thereon; a developing device to develop the latent image with a developing agent to form a toner image; and a transfer device (i.e., the transfer rollers 4K, 4Y, 4M, and 4C) to transfer the toner image from a transfer position of the image bearing member onto a transfer medium. One rotation period of each of the first and the second rollers is 1/n times a distance between the exposure position and the transfer position in the direction of rotation of the image bearing member, where n is an integer. With this configuration, image defects such as color drift are prevented.

According to an aspect of the disclosure, the target to be driven by the drive unit includes at least one of an intermediate transfer belt, a transfer drum, a photosensitive drum, and a direct transfer belt. With this configuration, image defects such as color drift are prevented.

According to an aspect of this disclosure, the present invention is employed in the image forming apparatus. The image forming apparatus includes, but is not limited to, an electrophotographic image forming apparatus, a copier, a printer, a facsimile machine, and a multi-functional system.

Furthermore, it is to be understood that elements and/or features of different illustrative embodiments may be combined with each other and/or substituted for each other within the scope of this disclosure and appended claims. In addition, the number of constituent elements, locations, shapes and so forth of the constituent elements are not limited to any of the structure for performing the methodology illustrated in the drawings.

Example embodiments being thus described, it will be obvious that the same may be varied in many ways. Such exemplary variations are not to be regarded as a departure from the scope of the present invention, and all such modifications as would be obvious to one skilled in the art are intended to be included within the scope of the following claims.

What is claimed is:

1. A drive unit, comprising:
   a drive pulley connected to a drive source;
   a driven pulley connected to a target to be moved;
   at least one relay pulley to transmit power from the drive pulley to the driven pulley;
   a plurality of belts entrained around and stretched taut between the drive pulley, the driven pulley, and the relay pulley, the plurality of belts including a first belt entrained around the drive pulley and the relay pulley, and a second belt entrained around the relay pulley and the driven pulley;
   a first tension application device to contact the first belt to provide tension thereto; and
   a second tension application device to contact the second belt to provide tension thereto,
   wherein the first belt and the second belt have a positional relation in a direction of rotation thereof in that a cyclic speed variation component in one rotation period of the first belt transmitted to the driven pulley via the relay pulley and a speed variation component in one rotation period of the second belt transmitted to the driven pulley counteract each other.

2. The drive unit according to claim 1, wherein the first tension application device contacts a surface of the first belt which slackens, and the second tension application device contacts a surface of the second belt which slackens.

3. The drive unit according to claim 1, wherein the first tension application device and the second tension application device are disposed such that a winding angle of the first belt wound around the drive pulley coincides with a winding angle of the second belt wound around the relay pulley.

4. The drive unit according to claim 1, wherein the first tension application device and the second tension application device provide tension to the first belt and the second tension such that the tension of the first belt coincides with the tension of the second belt.

5. The drive unit according to claim 1, further comprising a housing,
   wherein the first tension application device includes a first roller and the second tension application device includes a second roller, and the relay pulley is movably disposed relative to the housing;
   wherein as the relay pulley is moved, the first belt is pressed against the first roller and the second belt is pressed against the second roller.

6. The drive unit according to claim 1, wherein each of the first roller of the first tension application device and the second roller of the second tension application device includes a mark by which a phase of one rotation period of the first roller and a phase of one period of rotation of the second roller are aligned.

7. An image forming apparatus, comprising:
   a housing;
   an image forming unit to form an image; and
   the drive unit of claim 1 to drive a target disposed in the housing,
   wherein the image forming unit and the drive unit are disposed in the housing.

8. The image forming apparatus according to claim 7, further comprising a plurality of the image forming units arranged in a certain direction, each of the plurality of image forming units including an image bearing member,
   wherein one rotation period of each of the first and the second rollers is 1/n times a station pitch, where n is a positive integer and the station pitch is a distance between adjacent image forming units.

9. The image forming apparatus according to claim 7, further comprising:
   a latent image forming device disposed near the image bearing member, to expose the surface of the image bearing member at an exposure position to form a latent image thereon;
   a developing device to develop the latent image with a developing agent to form a toner image; and
   a transfer device to transfer the toner image from a transfer position of the image bearing member onto a transfer medium,
   wherein one rotation period of each of the first and the second rollers is 1/n times a distance between the exposure position and the transfer position in the direction of rotation of the image bearing member, where n is a positive integer.

10. The image forming apparatus according to claim 7, wherein the target to be driven by the drive unit includes at least one of an intermediate transfer belt, a transfer drum, a photosensitive drum, and a direct transfer belt.

* * * * *